June 27, 1933.  J. J. PELOUCH  1,915,443

LUBRICANT DISPENSING DEVICE

Filed Jan. 27, 1931

Inventor

James J. Pelouch
By Bates, Golrick & Teare
Attorney

Patented June 27, 1933

1,915,443

UNITED STATES PATENT OFFICE

JAMES J. PELOUCH, OF NEWBURG HEIGHTS, OHIO, ASSIGNOR TO THE UNITED STATES AIR COMPRESSOR COMPANY, OF CLEVELAND, OHIO, A CORPORATION OF OHIO

LUBRICANT DISPENSING DEVICE

Application filed January 27, 1931. Serial No. 511,520.

This invention relates to grease guns and particularly to those that are adapted for use in greasing automobiles, industrial machines and the like. Grease guns of this type usually have a coupling that is adapted to be brought into engagement with a fitting on the part to be lubricated before the pressure generating device associated with the gun is actuated. Where the bearings to be lubricated are frozen to such an extent that enormous pressure must be generated to force the lubricant through the bearing, the operator is unable to exert sufficient pressure upon the coupling to remove it from the fitting. Accordingly, the practice heretofore has been to place a manually operable relief valve in the form of a pet cock, that is adapted when opened to allow grease from the discharge chamber to be ejected into the atmosphere.

I have found that such method of pressure relief is objectionable in that it causes the expulsion of grease onto the floor or onto the clothes of the operator, and in that the operator is apt to leave the valve open, thus causing the expulsion of grease in a fine stream from the valve.

An object of my invention is to provide an arrangement that is adapted to relieve the pressure automatically in the discharge chamber whenever the pressure generating device becomes inactive. Thus, the coupling may be quickly and readily withdrawn from engagement with the associated fitting regardless of the pressure that was necessary to eject the grease into such fitting.

I carry out my invention by utilizing a pressure relief valve, that is adapted to equalize the pressure between the discharge member and the source of grease supply automatically, as soon as the pressure generating device shall have completed the pressure stroke. For economy of space and ease of manufacture and assembly, I prefer to install the pressure relief valve within the discharge valve, which is normally adapted to control the communication between the pressure generating device and the discharge conduit.

Figure 1:
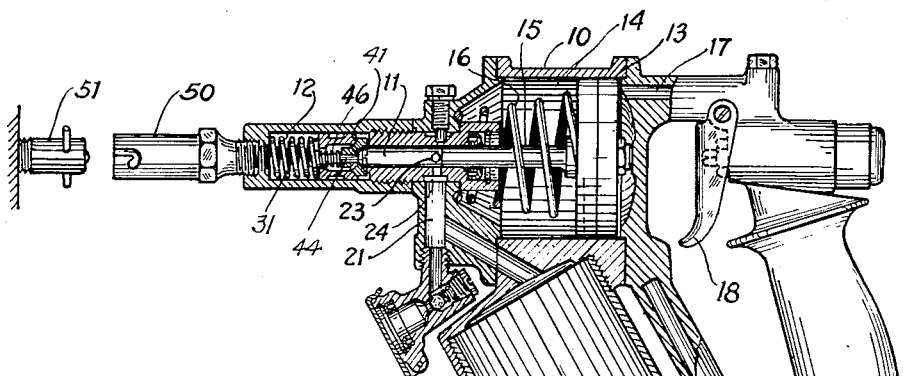
Figure 3:
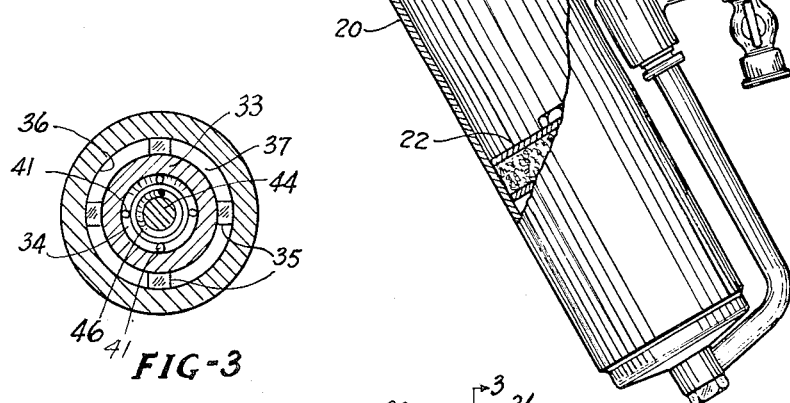
Figure 2:
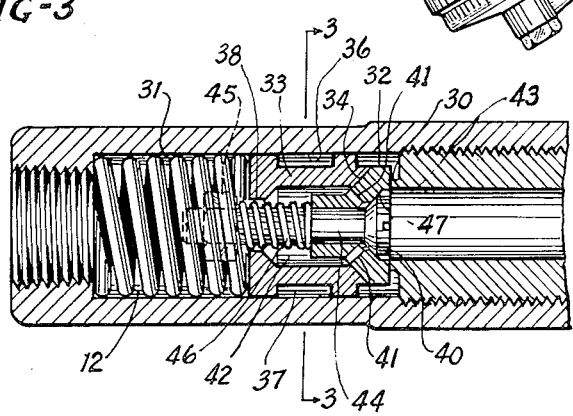

Referring now to the drawing, Fig. 1 is a side elevation partly in section of a grease gun embodying my invention; Fig. 2 is a longitudinal section on an enlarged scale adjacent that portion of the gun that utilizes my invention, and Fig. 3 is a section taken on the line 3—3 in Fig. 2.

A grease gun with which I have shown my invention has a casing 10 that encloses a grease cylinder 11, a discharge member 12 and a pressure generating device. Such device may take the form of an air operated piston 13 that is mounted for reciprocation within a cylinder 14 and that carries a plunger 15. Such plunger is adapted in turn to be reciprocated within the cylinder 11 whenever the air operated piston is reciprocated within its cylinder. Such reciprocation may be accomplished by the introduction of air under pressure on one side of the piston until the plunger shall have reached the end of its stroke, and in the reverse direction by a spring 16 as soon as the air pressure shall have been released.

The admission of air into the cylinder 14 may be controlled by a valve that normally closes the passageway 17 from communication with the source of air supply, and such valve is adapted to be opened manually by actuation of a trigger 18. When the pressure on the trigger is released, provision is then made for the escape of air from the cylinder 14 to the atmosphere. The details of such valve mechanism are not illustrated herein, as they form no part of the present invention. They have merely been described for the purpose of showing an operative device.

A source of grease supply for the gun is illustrated, as comprising a container 20 that is attached to the casing and that is adapted to communicate with the cylinder 11 through a passageway 21. Suitable means are then utilized for placing initial pressure upon the grease within the container. Such means may comprise a spring that normally urges a piston 22 axially of the container, or may comprise air under pressure from the same source of air supply for actuation of the pressure generating device. The passageway 21 communicates with the cylinder through openings 23 that extend radially from the annular opening 24 surrounding the cylinder.

These openings serve to equalize the pressure between the discharge conduit and the source of supply when the parts are in the position shown in Fig. 1. The pressure in the source of supply is not great enough to prevent the manual operation of the coupling 50—51 for disengagement purposes.

The discharge valve is indicated at 33 as having spacing and guiding members 35 adapted to contact the inner surface 36 of the discharge chamber. These spacers leave passageways 37 by which the grease may be discharged. A spring 31 may be provided to return the discharge valve against the seat 30 upon retraction of the plunger. An opening from the discharge chamber into the center of the discharge valve is shown at 38. This allows pressure to be communicated to the relief device.

The discharge valve may be composed of two parts 32 and 33, the part 33 centering the valve and the part 32 engaging the seat 30. A joint 34 between these parts permits relative movement so that a tight seating of the valve is assured. The joint surfaces at 34 are substantially conical and preferably slightly spherical.

The pressure relief valve, which I prefer to use is carried by the discharge valve, and particularly by the seat engaging member 32. To this end, the member 32 has a chamber 40 therein, that communicates through passageways 41 with the chamber 42 within the member 33. The chamber 40 is also adapted to communicate with the cylinder 11 when a valve member 43 is opened. Such last named member is shown as being mounted on the end of a valve stem 44 that extends axially through members 32 and 33 and that is provided with an abutment 45 adjacent the end thereof. A spring 46 surrounds the stem and extends between the abutment and the member 32 and tends normally to maintain the valve member 43 in engagement with its seat 47. Thus, when the pressure in the generating cylinder exceeds that in the discharge conduit, the valve 43 will remain closed. On the other hand when the pressure in the discharge chamber exceeds that in the cylinder 11, the auxiliary or relief valve will open automatically, and thereby permit equalization of fluid pressure between the two chambers. Such action occurs at the end of each pressure stroke of the plunger.

An important advantage of my invention is the fact that the couplings may be readily disconnected regardless of the pressure that existed in the discharge chamber at the end of any particular pressure stroke. The size of the pressure relief valve opening however, is sufficiently small that the pressure is not equalized instantly, thus an operator can build up pressure within the discharge chamber by actuating the trigger to open the air supply valve as soon as the plunger shall have reached the end of its return stroke. In addition, my invention effects a pressure release that permits the coupling to be readily and easily withdrawn without necessitating the expulsion of grease onto any exterior part of the gun where it is likely to be dropped onto the floor or expelled onto the clothes of the operator. Furthermore, it overcomes the objection that is inherent in the use of a manually controlled relief valve, in that it prevents the possibility of the gun being operated when the relief valve is inadvertently left open.

I claim:—

1. A grease gun having a grease cylinder, a plunger therein, means for reciprocating the plunger within the cylinder, a discharge valve associated within the cylinder, a discharge conduit, and a pressure relief valve carried by the discharge valve and communicating with the discharge conduit, the pressure relief valve being operable in a direction reverse to that of the discharge valve.

2. A grease gun having a cylinder, and a plunger therein and having a discharge conduit leading from the cylinder, a valve within the conduit and adapted to permit the flow of grease from the cylinder into the conduit when the plunger is moved in one direction and a pressure relief valve providing communication between the conduit and the discharge end of the cylinder when the plunger is moved in the reverse direction.

3. A grease gun, comprising in combination, a casing, a cylinder therein, a plunger mounted for reciprocation within the cylinder, said casing terminating in a discharge conduit, the end of the cylinder terminating in a valve seat, a check valve slidably mounted within the discharge conduit, and adapted to engage the seat, and a pressure relief valve carried by the check valve, and opening directly from the discharge conduit into the cylinder.

4. In a grease gun, the combination with a discharge chamber, of a discharge valve member, having a lubricant passageway extending therethrough, said passageway communicating with the discharge chamber, and said discharge valve member having a valve seat adjacent said passageway, a second valve member carried by the first named member, and means coacting with each of said members for normally holding the second named member against said seat.

5. A grease gun, comprising in combination, a casing, a pressure generating device mounted for reciprocation within the casing, a source of air under pressure for operating the device in one direction, a spring for operating it in the reverse direction, said device also including a cylinder and a plunger operable therein, said casing having a discharge chamber in communication with the cylinder, a check valve within said chamber for controlling the flow of lubricant from the cylinder and into the chamber, and a pressure relief valve carried by the check valve and operable by the pressure in the discharge chamber in a reverse direction to the check valve for reducing the pressure difference between the discharge chamber and the cylinder when the generating device is actuated under the influence of the spring.

6. A grease gun having a pressure generating cylinder, a valve seat thereon, a discharge conduit in communication therewith, and a check valve in said conduit for controlling the flow of material from the cylinder to the conduit, said valve comprising two co-operating members, both of said members being in communication with the discharge conduit, one of said members being adapted to engage the valve seat, and the other of said members being adapted to slidably engage the wall of the conduit, and means within the conduit for normally urging the second member into engagement with the first member, and thereby to urge the first member into engagement with the associated valve seat.

7. A grease gun comprising in combination, a pressure generating device, including a cylinder and a plunger operable therein, a discharge conduit leading from the cylinder, a discharge valve within the conduit, said valve being disposed in axial alignment with the cylinder, a valve seat mounted on the end of the cylinder and adapted to be engaged by the valve, and a pressure relief valve disposed in axial alignment with the cylinder and the check valve, said relief valve communicating with the discharge conduit and operating to reduce the pressure difference between the discharge conduit and the cylinder when the pressure within the conduit exceeds that within the cylinder.

8. A grease gun, comprising in combination, a high pressure cylinder, a piston reciprocable therein, a grease discharge chamber, a check valve between the cylinder and the chamber, said check valve being operative to permit the flow of grease from the cylinder into the discharge chamber when the piston is actuated in a pressure building direction, and means located at the discharge end of said cylinder operable to automatically relieve the pressure in the discharge chamber without changing the effective volume of the discharge chamber when said piston starts to move in the opposite direction.

9. A grease gun having a pressure building chamber, a reciprocable plunger therein, a discharge conduit leading from the chamber, a source of grease supply also leading from the chamber, a discharge valve between the chamber and the conduit, said valve being adapted to permit the flow of grease from said means into the discharge conduit, and to restrict the flow in the opposite direction, and pressure operable means positioned at the discharge end of the chamber for reducing the pressure difference between the discharge conduit and the source of supply, said means being operable by pressure in the discharge conduit acting upon said means at the start of the withdrawal stroke of the plunger.

10. A grease gun comprising in combination, a pressure generating device, a grease discharge chamber, a check valve between the device and the chamber, said check valve being operative to permit the flow of grease from the generating device and into the discharge chamber when the device is actuated in a pressure building direction, a communicating passage-way between the discharge chamber and the discharge end of the generating device, means operable by pressure in the device for closing said passage-way, and said means being operable by pressure in the discharge chamber for opening said passage-way.

11. A grease gun comprising in combination a casing, a cylinder therein, a plunger mounted for reciprocation within the cylinder, said casing terminating in a discharge conduit, the end of the cylinder terminating in a valve seat, a check valve slidably mounted within the discharge conduit, said check valve having a centering portion adapted to center the valve in the discharge conduit, and a seat-engaging portion adapted to engage the valve seat, there being a joint between the two portions to permit relative movement between them, and a pressure-relief valve carried by the seat-engaging portion of the check valve and opening directly from the discharge conduit into the cylinder.

12. A grease gun comprising in combination a pressure generating device, a grease discharge chamber, a conduit between the chamber and the discharge end of the generating device, a valve within the conduit adjacent the generating-device-end thereof, means for normally closing the valve, the valve being operable by pressure in the generating device for closing said conduit, and said valve being operable by pressure in the chamber for opening said conduit.

In testimony whereof, I hereunto affix my signature.

JAMES J. PELOUCH.